US009566889B2

(12) United States Patent
Nagayasu et al.

(10) Patent No.: US 9,566,889 B2
(45) Date of Patent: Feb. 14, 2017

(54) VEHICLE SEAT (71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Hidetaka Nagayasu, Toyota (JP); Osamu Kaneko, Toyota (JP); Kohshi Katoh, Hadano (JP); Eishi Takeuchi, Nagoya (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/734,494

(22) Filed: Jun. 9, 2015

(65) Prior Publication Data
US 2015/0352981 A1 Dec. 10, 2015

(30) Foreign Application Priority Data

Jun. 10, 2014 (JP) .................. 2014-119353

(51) Int. Cl.
*B60N 2/68* (2006.01)
*B60N 2/16* (2006.01)
*B60N 2/39* (2006.01)
*B60N 2/02* (2006.01)

(52) U.S. Cl.
CPC ............... *B60N 2/68* (2013.01); *B60N 2/1615* (2013.01); *B60N 2/1695* (2013.01); *B60N 2/39* (2013.01); *B60N 2002/0208* (2013.01)

(58) Field of Classification Search
CPC ........ B60N 2/39; B60N 2/1615; B60N 2/1695
USPC ................................. 297/344.1, 314
See application file for complete search history.

(56) References Cited

U.S. PATENT DOCUMENTS

| 9,045,058 B2* | 6/2015 | Katoh ................ B60N 2/39 |
| 2005/0104404 A1 | 5/2005 | Yamada et al. |
| 2013/0119715 A1 | 5/2013 | Medoro et al. |
| 2013/0119742 A1 | 5/2013 | Wiegelmann |
| 2014/0225407 A1* | 8/2014 | Nagayasu ........... B60N 2/14 |
| | | 297/344.1 |

FOREIGN PATENT DOCUMENTS

| EP | 1729995 | 8/2010 |
| EP | 2617601 | 7/2013 |

(Continued)

OTHER PUBLICATIONS

Extended European Search Report for EP 15170943.3 dated Oct. 19, 2015.

(Continued)

*Primary Examiner* — Anthony D Barfield
(74) *Attorney, Agent, or Firm* — Greenblum & Bernstein, P.L.C.

(57) ABSTRACT

A vehicle seat includes a supporting member that supports a load of a seated person, a cushion frame, a rear pipe that is rotatably attached to the cushion frame, a lifter link that is fixed to the rear pipe, and a bracket that is rotatably attached to the rear pipe. An inclination of the cushion frame changes when the cushion frame is moved up and down by tilting the lifter link. The supporting member is connected to the rear pipe via the bracket.

5 Claims, 8 Drawing Sheets (56) References Cited

FOREIGN PATENT DOCUMENTS

| JP | 03-025035 | 2/1991 | | |
|---|---|---|---|---|
| JP | EP 0548924 A1 * | 6/1993 | ............ | B60N 2/507 |
| JP | 2002-225600 | 8/2002 | | |
| JP | 2005-289171 | 10/2005 | | |
| JP | 2006-15116 | 1/2006 | | |
| JP | 2011-020659 | 2/2011 | | |
| JP | 2012-062020 | 3/2012 | | |
| WO | 2013/021497 | 2/2013 | | |

OTHER PUBLICATIONS

Japanese Office Action for JP App. No. 2014-119353 mailed on Apr. 12, 2016, along with partial English-language translation thereof.

* cited by examiner

VEHICLE SEAT

INCORPORATION BY REFERENCE

The disclosure of Japanese Patent Application No. 2014-119353 filed on Jun. 10, 2014 including the specification, drawings and abstract is incorporated herein by reference in its entirety.

BACKGROUND OF THE INVENTION

1. Field of the Invention

The invention relates to a vehicle seat. More particularly, the invention relates to a vehicle seat provided with a lifter mechanism.

2. Description of Related Art

A vehicle seat that employs a lifter mechanism is widely known. One known lifter mechanism serves to raise and lower the frame position of a seat cushion, and is configured to move the cushion frame up and down by tilting four lifter links (see Japanese Patent Application Publication No. 2006-15116 (JP 2006-15116 A). With the structure described in JP 2006-15116 A, the lifter links are fixed to a rear pipe that extends in the left-right direction, and the rear pipe rotates, sliding with respect to the seat cushion, in response to the lifter links tilting. The technology described in JP 2006-15116 A uses this structure to take the tension of a supporting member that extends between a front panel and the rear pipe and change it into vertical movement of the cushion frame.

SUMMARY OF THE INVENTION

Figure 8:
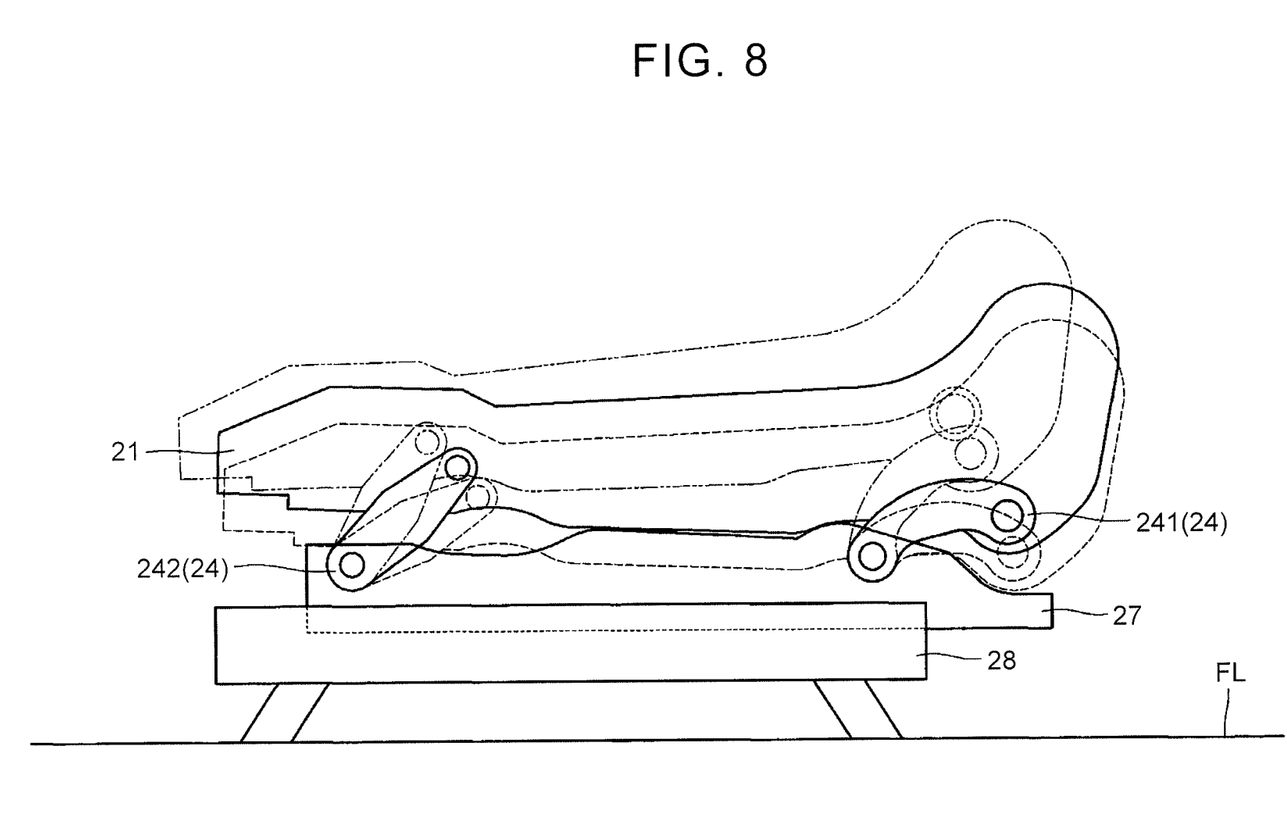
FIG. 8 is a view illustrating the behavior of a cushion frame when the seat cushion is moved up and down by a lifter mechanism.

As described in JP 2006-15116 A, when the cushion frame is moved up and down using a lifter mechanism, the tension of the cushion frame may change as shown in FIG. 8. With the structure shown in FIG. 8, the rear side of the cushion frame tends to move more easily than the front side does in the vertical direction. As a result, the inclination of the cushion frame changes. With this kind of structure, when the cushion frame is in an upper position or a lower position, the angle of the surface that supports a seated person may end up changing greatly. This may happen because the angular change of a supporting member substantially matches the angular change of the cushion frame. The inventor has examined whether it might be possible to mitigate this kind of angular change.

The invention provides a vehicle seat capable of mitigating a change in inclination of a supporting member which can occur due to a change in inclination of a cushion frame.

A first aspect of the invention relates to a vehicle seat that includes a supporting member that supports a load of a seated person, a cushion frame, a rear pipe that is rotatably attached to the cushion frame, a lifter link that is fixed to the rear pipe, and a bracket that is rotatably attached to the rear pipe. An inclination of the cushion frame changes when the cushion frame is moved up and down by tilting the lifter link, and the supporting member is connected to the rear pipe via the bracket.

According to this aspect of the invention, the supporting member is connected to the rear pipe via the bracket that is rotatably attached to the rear pipe, so it is possible to avoid having the relative positions of the cushion frame and the supporting member be fixed. Therefore, the angular change of the supporting member that occurs when the cushion frame is moved up and down is able to be smaller than the angular change of the cushion frame.

Also, in the aspect described above, the supporting member may be displaceable in a left-right direction by rotating around a rotational axis.

According to this structure, the supporting member is able to be displaced in the left-right direction by rotating around the rotational axis, so the pelvis of a person is able to be moved more easily in the left-right direction while the person is seated, and as a result, accumulation of fatigue is able to be inhibited. Further, the supporting member is able to be moved in the left-right direction in an arc, so the pelvis is able to be moved in the left-right direction without greatly upsetting the posture of the seated person.

In the structure described above, a wire may be provided on the bracket, and the supporting member may be able to move along the wire.

According to this structure, the supporting member is able to move along the wire when the supporting member rotates, so the trajectory of movement is able to be an appropriate one. Also, appropriate support by the supporting member is possible.

According to the aspect described above, a change in the inclination of the supporting member that may occur due to a change in the inclination of the cushion frame is able to be mitigated.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
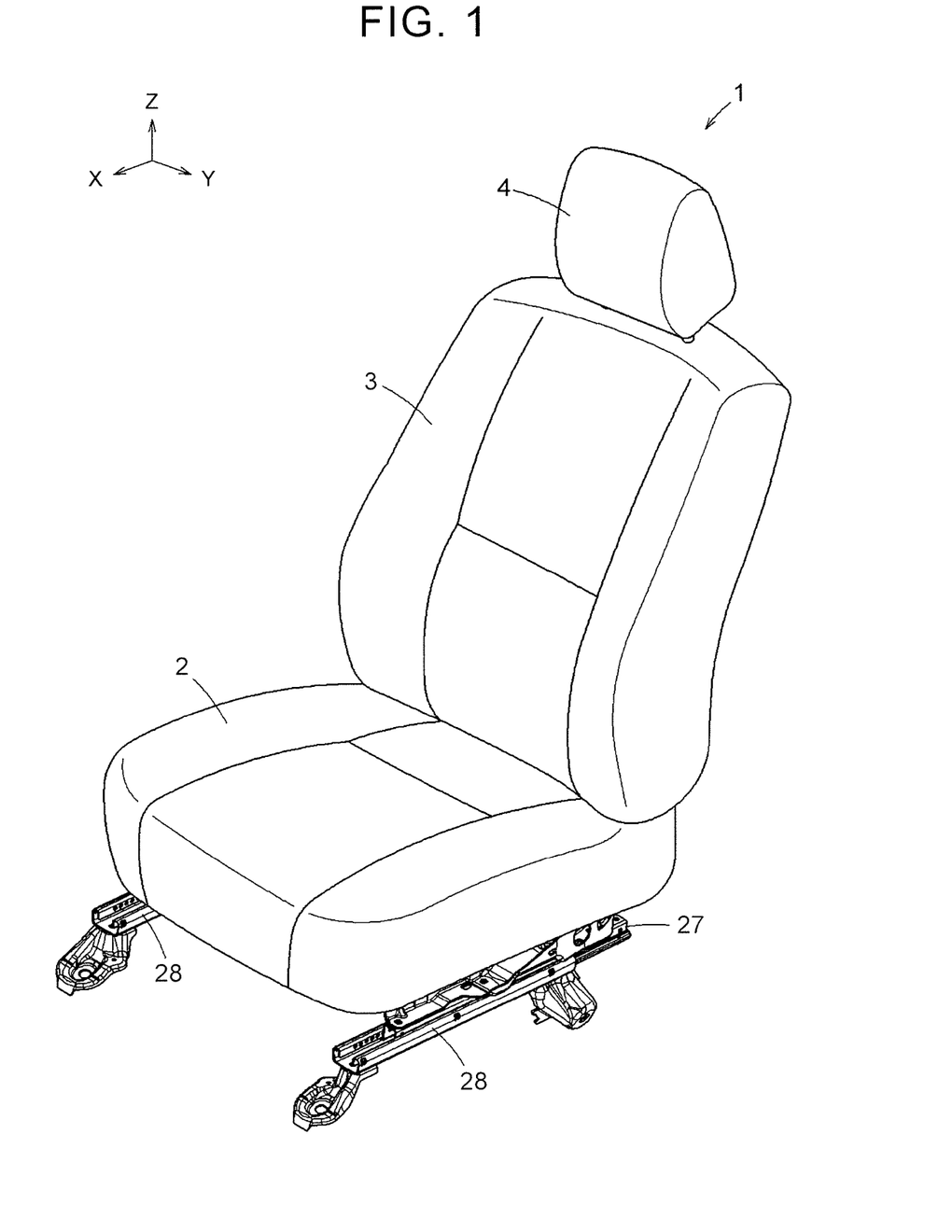
FIG. 1 is a perspective view of a vehicle seat according to one example embodiment of the invention.

Hereinafter, example embodiments of the invention will be described with reference to the accompanying drawings. Regarding directions such as a front-rear (longitudinal) direction, a left-right (lateral) direction, and an up-down (vertical) direction in this specification, X is designated as the forward direction, Y is designated as the left direction, and Z is designated as the upward direction, in FIG. 1 and the like. For example, normally that which is in the field of view when a person is seated is forward, and the side behind the head, which is not in the field of view, is rearward.

A vehicle seat 1 according to this example embodiment is applied to an automobile in particular. The vehicle seat 1 includes a seat cushion 2 that has a support surface that mainly faces the thighs of a seated person, a seatback 3 that is able to tilt with respect to the seat cushion 2 and has a support surface that mainly faces the back of the seated person, and a headrest 4 that is connected to the seatback 3 and mainly faces the head of the seated person.

The seat cushion 2 includes a cushion frame 21 that forms a frame of the seat (see FIGS. 2 to 5). The seat cushion 2 also includes a rear pipe 22 that is rotatably attached to the cushion frame 21, and lifter links 24 that are fixed to the rear pipe 22. One end side of each lifter link 24 is able to be fixed so as to be unable to move in the horizontal direction with respect to a floor FL side, while enabling the cushion frame 21 to be moved up and down by tilting the lifter link 24. When the cushion frame 21 is moved up and down, the inclination of the cushion frame 21 changes, but this is due to the fact that a difference in height position of the front end side and the rear end side of the cushion frame 21 changes when the cushion frame 21 is moved up and down.

A supporting member 25 capable of supporting the load of the seated person is provided in the seat cushion 2. One end side of this supporting member 25 is connected to the cushion frame 21. Also, the other end of the supporting member 25 is connected to the rear pipe 22 via a bracket 26 and the like that is rotatably attached to the rear pipe 22 (see FIGS. 2 and 3). The bracket 26 rotates in the direction of the arrows in FIG. 2 by moving along an outer peripheral surface of the rear pipe 22. With this kind of structure, when an attempt is made to change the height of the rear end of the cushion frame 21 from the highest position (as indicated by the alternate long and two short dashes line in FIG. 8) to the lowest position (indicated by the broken line in FIG. 8), for example, the rear pipe 22 rotates. The angle of the supporting member 25 is able to be adjusted by rotating the bracket 26 with respect to the rear pipe 22, so the bracket 26 displays behavior different from the rotation of the rear pipe 22. Similarly, the rear pipe 22 also rotates when an attempt is made to change the height of the rear end of the cushion frame 21 from the lowest position to the highest position. The angle of the supporting member 25 is able to be adjusted by rotating the bracket 26 with respect to the rear pipe 22, so the bracket 26 displays behavior different from the rotation of the rear pipe 22. Because such an event is able to occur, the angular change of the supporting member 25 is able to be made smaller than the angular change of the cushion frame 21. Therefore, angular change of the surface supporting the seated occupant is able to be reduced.

The internal structure of the seat cushion 2 will now be described in more detail. The seat cushion 2 includes the cushion frame 21 that forms a frame of the seat. The cushion frame 21 is formed having a general U-shape when viewed from above. The cushion frame 21 in this example embodiment is formed by a front panel 211 and two side frames 212 that are connected one to each of the two left and right end sides of the front panel 211 (see FIGS. 2 and 4). A through-hole 212a is provided in the rear side of each side frame 212. The rear pipe 22 is inserted into this through-hole 212a. The rear pipe 22 is attached in a rotatable state to the rear pipe 22. Two rear lifter links 241 that are the lifter links 24 arranged on the rear side of the seat cushion 2 are fixed to the rear pipe 22. The rear pipe 22 is configured to be able to rotate inside the through-holes 212a by the rear lifter links 241 tilting. Front lifter links 242, from among the lifter links 24, that are arranged on the front side of the seat cushion 2 are fixed to a front pipe 23 that is rotatably attached to the side frames 212. The rear lifter link 241 and the front lifter link 242 are tiltably attached to an upper rail 27. The upper rail 27 is able to slide with respect to a lower rail 28 that is fixed to the floor FL, so the cushion frame 21 is able to move in the front-rear direction by the upper rail 27 sliding with respect to the lower rail 28.

An engagement mechanism 51 is attached between the cushion frame 21 and the rear pipe 22. The rear pipe 22 is able to be rotated by operating this engagement mechanism 51. The engagement mechanism 51 includes a sector gear 52 that is fixed to the rear pipe 22 side, and a pinion gear 53 that is rotatably attached to the side frame 212 (see FIGS. 3 and 4). In this example embodiment, the sector gear 52 is provided on the rear lifter link 241 arranged on the right side. The sector gear 52 and the pinion gear 53 are arranged in mesh with each other, and are configured such that the meshing position between the pinion gear 53 and the sector gear 52 is able to be changed by rotating the pinion gear 53. That is, by rotating the pinion gear 53, the rear pipe 22 rotates and consequently adjusts the relative angle between the cushion frame 21 and the rear lifter link 241, thus enabling the cushion frame 21 to be moved up and down. In this example embodiment, the tilt angle of the front lifter links 242 with respect to the cushion frame 21 changes in conjunction with a change in the tilt angle of the rear lifter link 241 with respect to the cushion frame 21. A distance L1 between a rotational central axis that is the rotational center of the rear lifter link 241 on the floor FL side and a rotational central axis (a central axis of the rear pipe 22) that is the rotational center on the cushion frame 21 side, is longer than a distance L2 between a rotational central axis that is the rotational center of the front lifter link 242 on the floor FL side and a rotational central axis that is the rotational center on the cushion frame 21 side. The cushion frame 21 is structured such that the rear end side is more easily vertically displaced than the front end side (see FIG. 5).

A front end side of the supporting member 25 is connected to the cushion frame 21, and a rear end side of the supporting member 25 is connected to the bracket 26. The supporting member 25 in this example embodiment has a spring member 251, as well as a movable frame 252 across which the spring member 251 is able to be stretched. The movable frame 252 includes a frame portion 252a formed having a generally square shape in a sectional view, and a support portion 252b formed extending upward at an angle from both the left and right of the frame portion 252a (see FIG. 3). The spring member 251 that is formed in a planar shape is attached to the frame portion 252a by bending a rod-shaped member. The spring member 251 is able to elastically deform under the load applied by the seated person. The supporting member 25 is configured such that a pad member, not shown, is able to be arranged thereon, and is able to receive the load of the seated person applied to the supporting member 25 via this pad member and the like.

Figure 2:
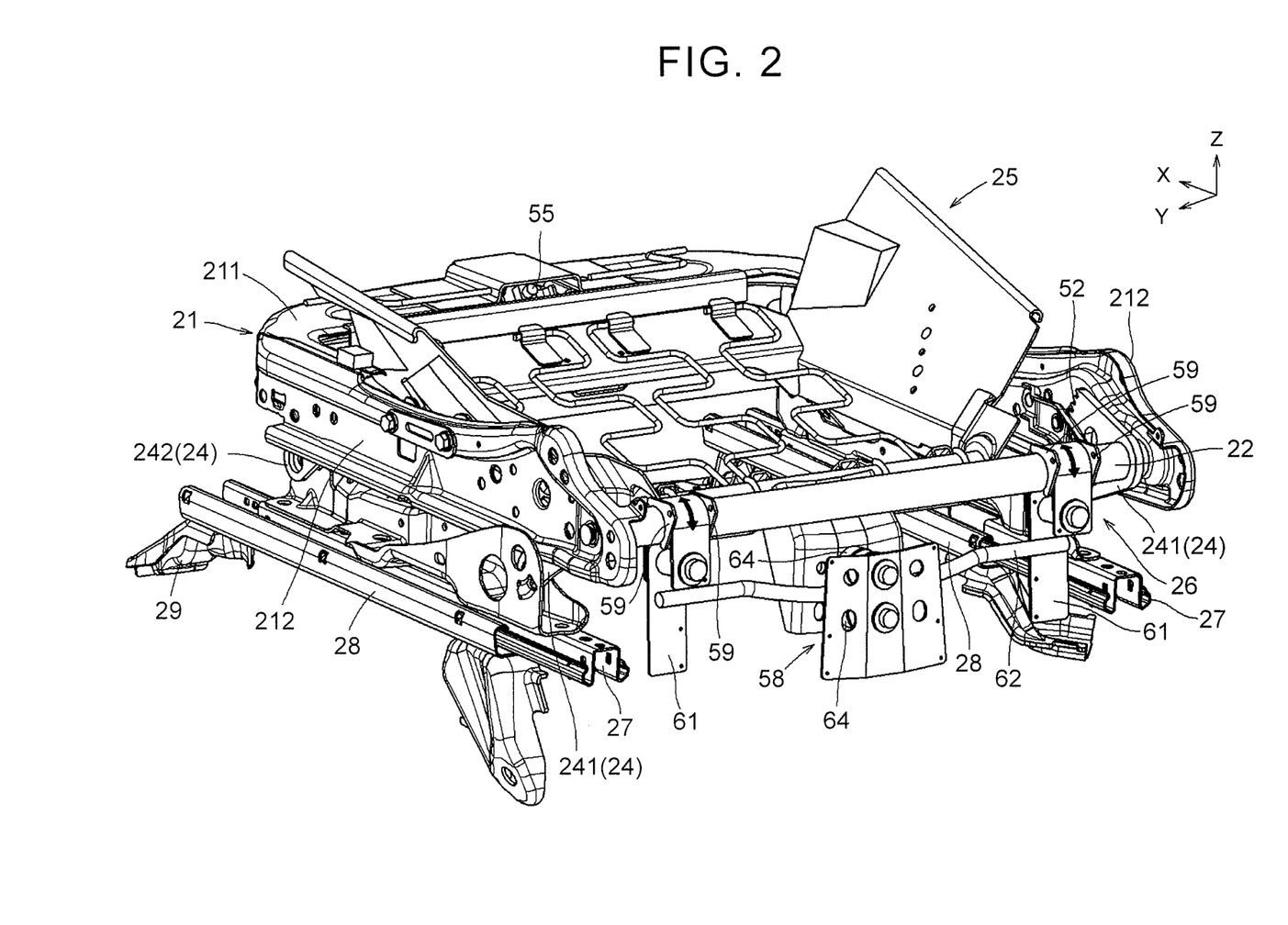
FIG. 2 is a perspective view of the internal structure of a seat cushion according to the example embodiment.
Figure 3:
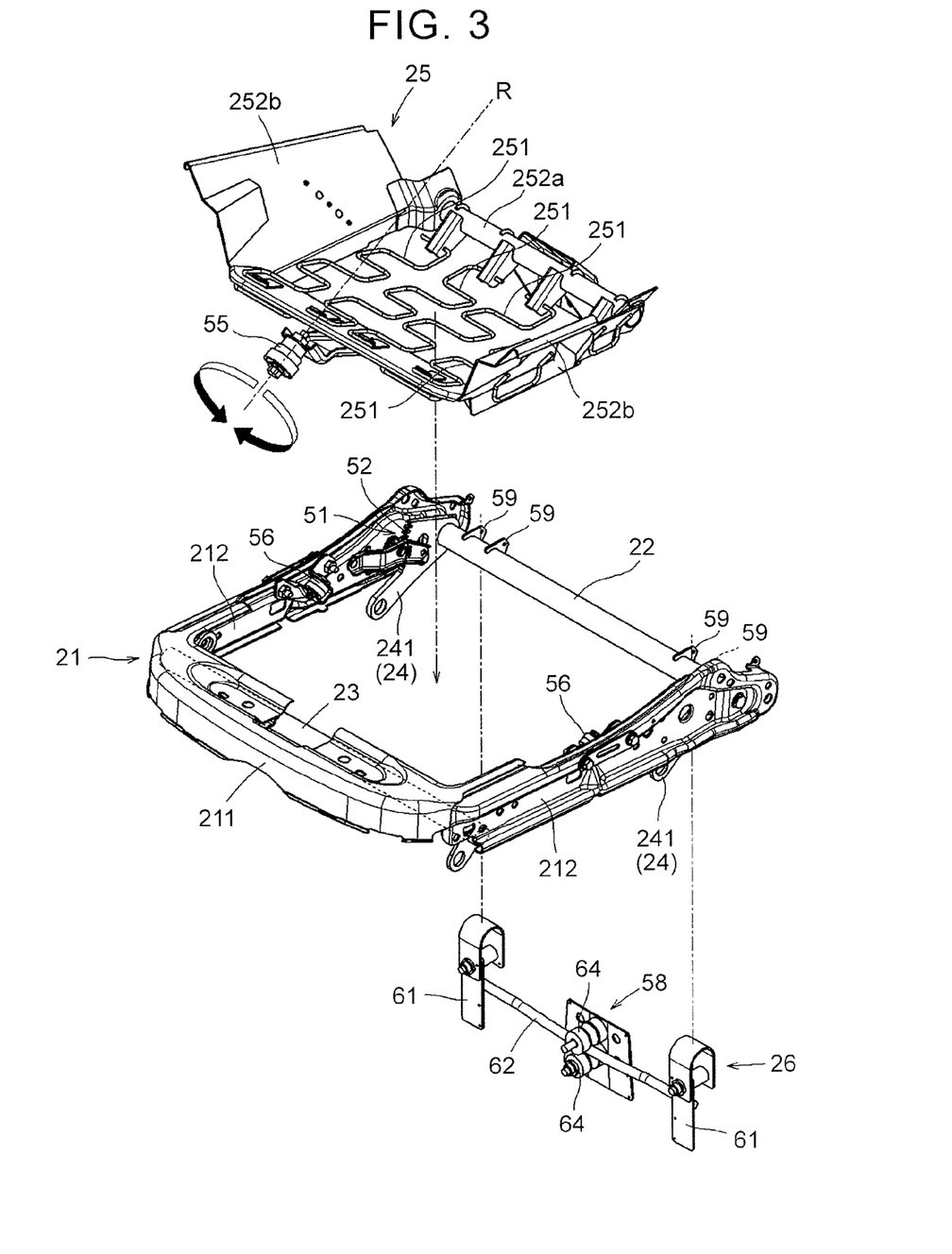
FIG. 3 is an exploded perspective view of the seat cushion according to the example embodiment.
Figure 4:
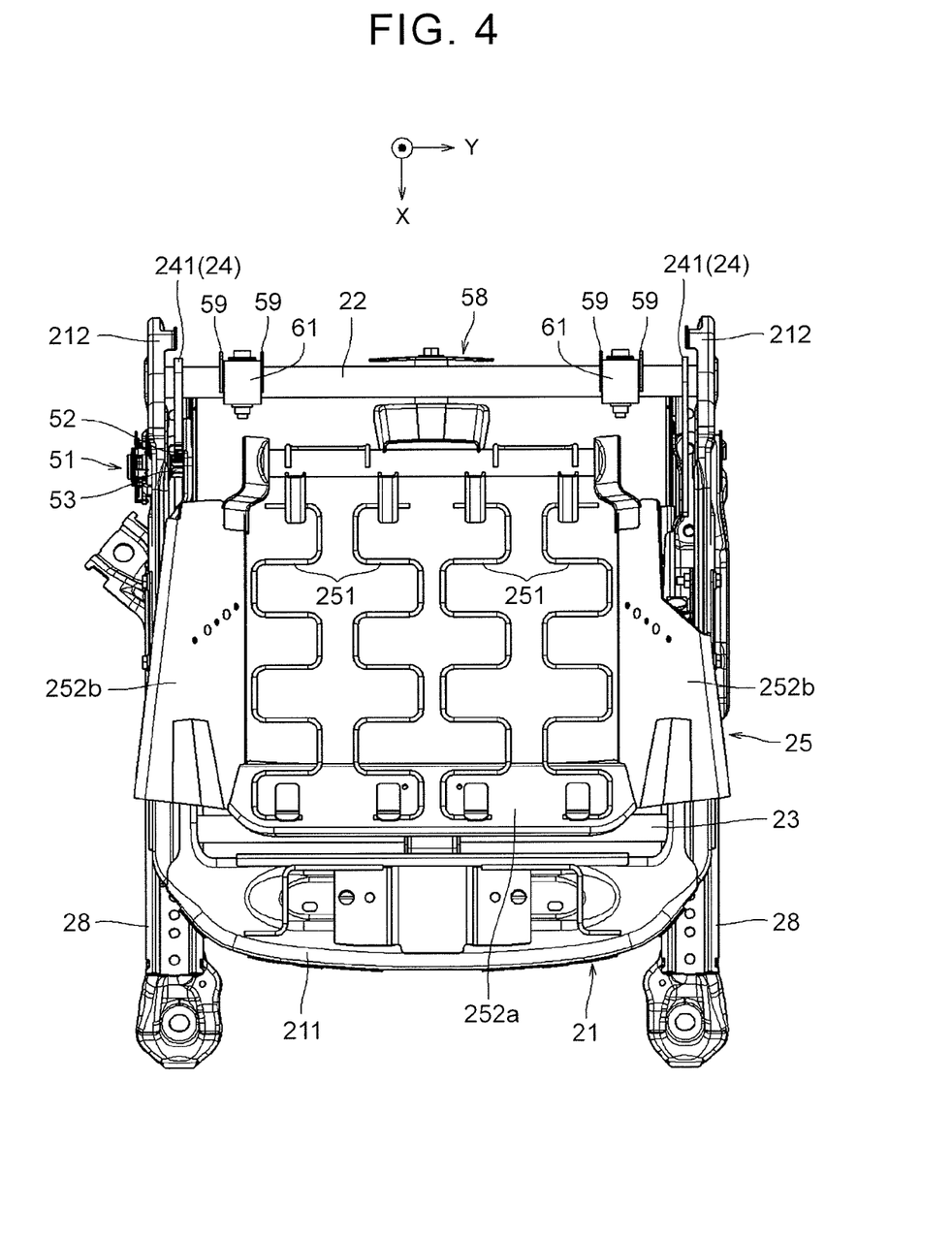
FIG. 4 is a plan view of the internal structure of the seat cushion according to the example embodiment.
Figure 5:
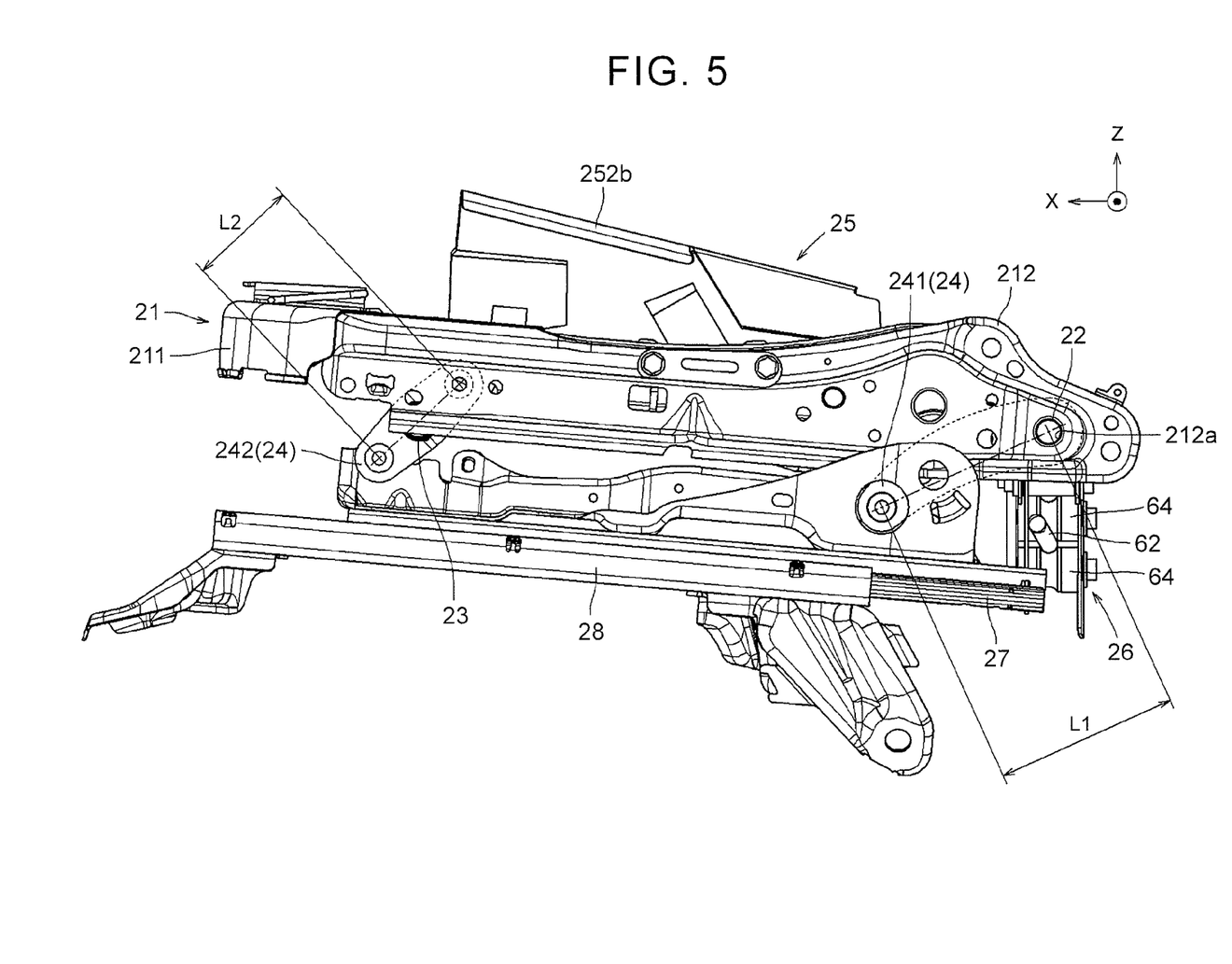
FIG. 5 is a side view of the internal structure of the seat cushion according to the example embodiment.
Figure 6:
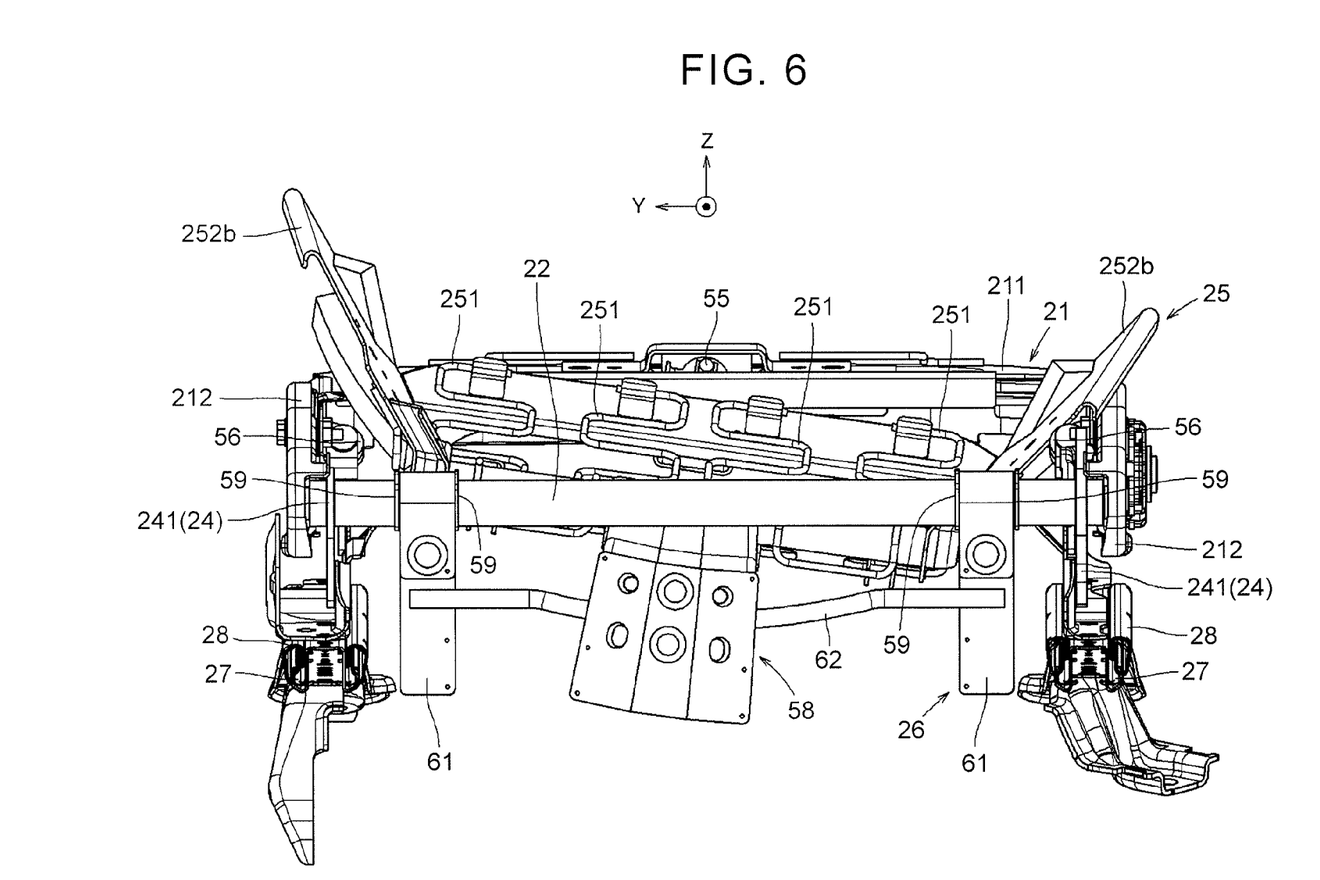
FIG. 6 is a rear view of the seat cushion showing a state in which a supporting member has been moved to the left by rotation.
Figure 7:
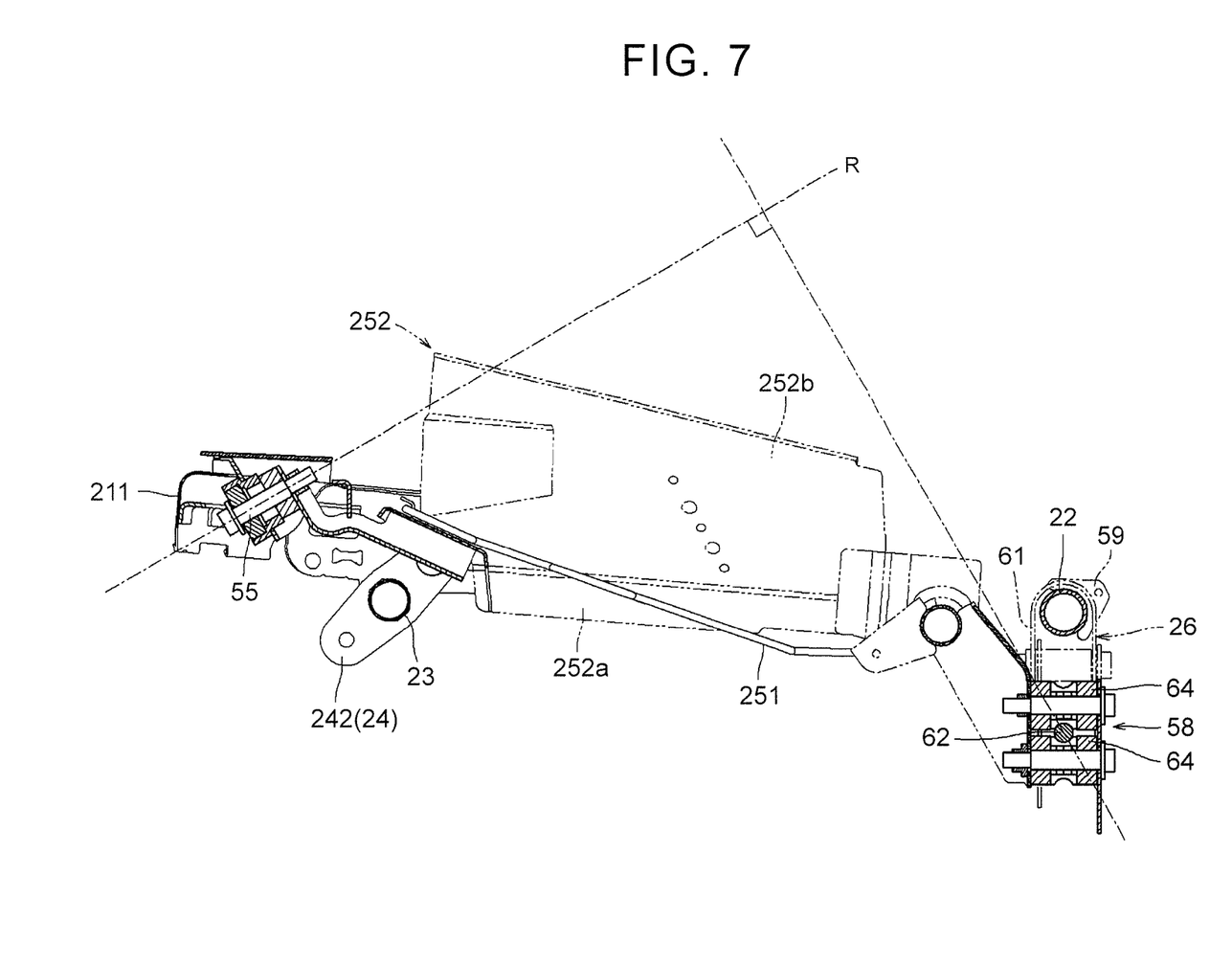
FIG. 7 is a view showing the positional relationship between a rotational axis, the supporting member, a wire of a bracket, and a rear pipe.

In order to enable the supporting member 25 to move in the left-right direction, the supporting member 25 is configured to be able to rotate around a rotational axis R formed in the length direction of a rotating shaft portion 55 provided on the front end side of the cushion frame 21 (see FIGS. 2, 6, and 7). One end side of the supporting member 25 is attached to the rotating shaft portion 55, and the other end side of the rotating shaft portion 55 is attached to the bracket 26. The supporting member 25 is slidably attached to the bracket 26, and the bracket 26 is rotatably attached to the rear pipe 22. Therefore, the supporting member 25 is connected to the rear pipe 22 via the bracket 26, so the supporting member 25 is relatively movably connected to the rear pipe 22.

A rotatable roller 56 is attached to the side frame 212. This roller 56 is configured to be able to contact the support portion 252b (see FIG. 3). The roller 56 is attached in a manner able to rotate in response to a load received from the supporting member 25, so the load from the supporting member 25 is able to be received without inhibiting the rotation of the supporting member 25.

An engaging portion 58 that is able to engage with the bracket 26 is provided on the supporting member 25. The bracket 26 of this example embodiment includes two hook members 61 each formed in a general J-shape in a sectional view using a flat plate, and a wire 62 that is connected to the two hook members 61 (see FIGS. 2 and 3). Pulleys 64 are provided juxtaposed in the vertical direction on the engaging portion 58. The wire 62 is able to be inserted between the pulleys 64. Because the wire 62 is positioned inserted between the pulleys 64, the engagement state between the wire 62 and the pulleys 64 is able to be maintained even if the vehicle vibrates. Also, the wire 62 and the pulleys 64 are able to move relatively smoothly while maintaining this engagement state. The engaging portion 58 of this example embodiment is detachably provided on the rear end of the supporting member 25, and is shown attached to the bracket 26 in FIG. 3.

A portion of the wire 62 of the example embodiment is curved in an arc shape (see FIG. 2). As shown in FIG. 7, the arced portion of the wire 62 is formed so as to be a certain distance away from the rotational axis R on a side orthogonal to the rotational axis R, and is able to rotate smoothly when the supporting member 25 rotates around the rotational axis R. Also, the wire 62 is fixed to the bracket 26 that is rotatably attached to the rear pipe 22, so the position of the wire 62 is also able to move somewhat in the front-rear direction. Therefore, the wire 62 is able to move in the front-rear direction by force transmitted to the wire 62 when the supporting member 25 rotates, and the rotation of the supporting member 25 is able to be smooth. A guide protruding portion 59 that restricts movement of the bracket 26 in the left-right direction is provided in the circumferential direction of the rear pipe 22, on the rear pipe 22. Therefore, even if the supporting member 25 moves in the left-right direction as a result of rotating, the bracket 26 is able to be inhibited from moving in the left-right direction.

Also, the bracket 26 is attached hanging downward on the rear pipe 22, and the engagement position of the supporting member 25 and the bracket 26 is lower than the rear pipe 22 (see FIGS. 2 and 7). Therefore, the position of the supporting member 25 is able to be relatively low even near the rear pipe 22. When this kind of structure is employed, the height of the seat cushion 2 of the overall seat is able to be equivalent to that of the related art, even if the thickness of the pad member that is placed on the supporting member 25 is thick, so the vehicle seat 1 is able to be more comfortable than it appears.

The vehicle seat 1 of this example embodiment includes the supporting member 25 that is able to support the load of the seated person, the cushion frame 21, the rear pipe 22 that is rotatably attached to the cushion frame 21, and the lifter link 24 that is fixed to the rear pipe 22. The vehicle seat 1 is configured such that the inclination of the cushion frame 21 changes when the cushion frame 21 is moved up and down, by tilting the lifter link 24. In this vehicle seat 1, the bracket 26 is rotatably attached to the rear pipe 22, and the supporting member 25 is connected to the rear pipe 22 via the bracket 26. That is, the supporting member 25 is connected to the rear pipe 22 via the bracket 26 that is rotatably attached to the rear pipe 22, which makes it possible to avoid having relative positions of the cushion frame 21 of the supporting member 25 be fixed. Therefore, the angular change of the supporting member 25 that occurs when the cushion frame 21 is moved up and down is able to be smaller than the angular change of the cushion frame 21.

Also, the supporting member 25 is able to be displaced in the left-right direction by rotating around the rotational axis R, so the pelvis of a person is able to be moved more easily in the left-right direction while the person is seated, and as a result, accumulation of fatigue is able to be inhibited. Further, the supporting member 25 is able to move in the left-right direction in an arc, so the pelvis is able to be moved in the left-right direction without greatly upsetting the posture of the seated person.

Also, the wire 62 is provided on the bracket 26, and the supporting member 25 is able to move along the wire 62. Therefore, the supporting member 25 is able to move along the wire 62 as the supporting member 25 rotates, so the trajectory of movement is able to be an appropriate one. Also, appropriate support by the supporting member 25 is possible.

Also, in a normal state in which the supporting member 25 is substantially bilaterally symmetrical, rotation of the support portion 252b of the supporting member 25 and the side frame 212 is not restricted. On the other hand, when the supporting member 25 rotates a predetermined amount, it is able to be restricted from rotating any further by the support portion 252b provided on the supporting member 25 abutting against the side frame 212. Therefore, the supporting member 25 is able to be inhibited from rotating too much.

Heretofore, one example embodiment of the invention has been described, but the invention may also be carried out in modes other than the example embodiment described above. For example, the supporting member may also be configured to not move in the left-right direction. Alternatively, the supporting member may be configured to move in the left-right direction, but not rotate.

Further, the supporting member may also be configured without the movable frame. In this case, for example, one end of the spring member may be attached to the bracket, and the other end of the spring member may be attached to the cushion frame. Also, the supporting member may be configured without the spring member. In this case, the moveable frame may be made to more easily receive the load from the seated person by forming a bottom on a lower portion of the frame portion, or by extending a rod-shaped member across the frame portion.

Also, a member that engages with the wire does not have to be a pulley. For example, the wire may be engaged with the supporting member by opening a hole in a plate provided on the rear portion of the supporting member, and inserting the wire through the hole. Also, only one pulley, either the upper or the lower, may be provided, instead of both the upper and lower pulleys being provided. In this case as well, the engagement state between the wire and the supporting member is preferably able to be maintained using a member other than a pulley. Also, when only one pulley is provided, it is preferably provided above (i.e., on the upper side of) the wire.

Further, the vehicle is not limited to an automobile, but may also be a vehicle that flies through the air (i.e., an aircraft) such as an airplane or a helicopter, or a vehicle that travels on or under water such as a marine vessel or a submersible.

What is claimed is:
1. A vehicle seat comprising:
a supporting member that supports a load of a seated person;
a cushion frame;

a rear pipe that is rotatably attached to the cushion frame;
a lifter link that is fixed to the rear pipe; and
a bracket that is directly rotatably attached to the rear pipe, wherein
an inclination of the cushion frame changes when the cushion frame is moved up and down by tilting the lifter link, and
the supporting member is connected to the rear pipe via the bracket.

2. The vehicle seat according to claim 1, wherein the supporting member is displaceable in a left-right direction by rotating around a rotational axis.

3. The vehicle seat according to claim 2, wherein
a wire is provided on the bracket, and
the supporting member is movable along the wire.

4. The vehicle seat according to claim 1, wherein
the bracket is provided to extend below the rear pipe.

5. The vehicle seat according to claim 1, wherein
the supporting member is connected to the bracket below the rear pipe.

* * * * *